(12) United States Patent
Hiratsuka

(10) Patent No.: US 9,103,332 B2
(45) Date of Patent: Aug. 11, 2015

(54) REFRIGERATOR AND COMPRESSOR

(71) Applicant: SUMITOMO HEAVY INDUSTRIES, LTD., Tokyo (JP)

(72) Inventor: Yoshikatsu Hiratsuka, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 289 days.

(21) Appl. No.: 13/798,524

(22) Filed: Mar. 13, 2013

(65) Prior Publication Data
US 2013/0247608 A1    Sep. 26, 2013

(30) Foreign Application Priority Data
Mar. 22, 2012   (JP) ................... 2012-066329

(51) Int. Cl.
| F04B 35/04 | (2006.01) |
| F04B 17/04 | (2006.01) |
| F25B 1/02 | (2006.01) |
| F25B 9/14 | (2006.01) |
| F16F 3/02 | (2006.01) |

(52) U.S. Cl.
CPC ............. *F04B 17/042* (2013.01); *F04B 35/045* (2013.01); *F25B 1/02* (2013.01); *F16F 3/02* (2013.01); *F25B 9/14* (2013.01); *F25B 2400/073* (2013.01)

(58) Field of Classification Search
CPC .............. F25B 1/005; F25B 1/02; F25B 1/10; F25B 9/14; F25B 9/145; F04B 35/045; F04B 17/044; F04B 17/046; F04B 14/042; F16F 3/02
USPC ........................................................ 417/417
See application file for complete search history.

(56) References Cited

FOREIGN PATENT DOCUMENTS

| JP | 11-002469 | 1/1999 |
| JP | 11-002470 | 1/1999 |
| JP | 11002469 A | * 1/1999 |
| JP | 11-324914 | 11/1999 |
| JP | 2006-029137 | 2/2006 |
| JP | 2008-215440 | 9/2008 |
| JP | 2008215440 A | * 9/2008 |

OTHER PUBLICATIONS

Translation 1: Documenet No. JP 11002469 A Country: Japan Author: Miura, K Title: Stirling refrigerator Date: Jan. 1999.*
Translation 2: Documenet No. JP 2008215440 A Country: Japan Author: Yoshikatsu, H Title: Plate spring and refrigerator Date: Sep. 2008.*

* cited by examiner

*Primary Examiner* — Devon Kramer
*Assistant Examiner* — Chirag Jariwala
(74) *Attorney, Agent, or Firm* — IPUSA, PLLC (57) ABSTRACT

A refrigerator may include a compressor with a reciprocating member to compress or expand a working gas by undergoing reciprocating movement, and a leaf spring unit to support the reciprocating member. The leaf spring unit includes a leaf spring having a first rim fixed to a compressor body, a first hub arranged on an inner side of the first rim and mounted on the reciprocating member and a resilient arm part movably supporting the first hub with respect to the first rim, and an auxiliary spring having a second rim fixed to the compressor body, a second hub arranged on an inner side of the second rim and mounted on the reciprocating member and a pair of auxiliary spring parts supported in a form of cantilever on the second rim and the second hub. The leaf spring is arranged between the pair of auxiliary spring parts, and the pair of auxiliary spring parts opposes the resilient arm part.

6 Claims, 6 Drawing Sheets

REFRIGERATOR AND COMPRESSOR

RELATED APPLICATION

This application is based upon and claims the benefit of priority of the Japanese Patent Application No. 2012-066329, filed on Mar. 22, 2012, the entire contents of which are incorporated herein by reference.

BACKGROUND

1. Technical Field

The present invention relates to a refrigerator and a compressor, and more particularly to a refrigerator and a compressor that support, by a leaf spring (or flat spring), a reciprocating member that may undergo a reciprocating movement.

2. Description of Related Art

For example, a refrigerator, such as a Stirling refrigerator or the like, may include a compressor and an expander. This refrigerator may be configured to provide coldness by expanding, within the expander space, high-pressure working gas generated by the compressor.

The compressor generates fluid vibration by causing a piston to undergo a reciprocating movement within a cylinder. Hence, the cylinder and the piston are supported by a leaf spring in order to enable the cylinder and the piston to move relative to each other. The leaf spring may have a disk shape. The piston may be connected to a center of the disk-shaped leaf spring, and an outer peripheral part of the disk-shape leaf spring may be fixed to a housing of the compressor.

In addition, a plurality of slits may be formed in the leaf spring, so that a central part of the leaf spring is resiliently deformable with respect to the outer peripheral part of the leaf spring. The piston may undergo a horizontal reciprocating movement with respect to the cylinder, due to the resilient deformation of the leaf spring.

On the other hand, in order for the piston to positively undergo the reciprocating movement within the cylinder, it may be required to accurately set a spring constant of the leaf spring. However, it may be difficult to realize a desired spring constant using a single plate member, both from the point of view of machining and from the point of view of adjusting the spring constant. For this reason, a spring unit may be formed by laminating leaf springs via a spacer, where each leaf spring is formed by a plurality of thin plates, in order to support the piston by this spring unit.

SUMMARY

According to one aspect of the present invention, a refrigerator may include a compressor; and an expander configured to generate coldness in working gas supplied from the compressor, wherein the compressor includes a compressor body; a reciprocating member configured to compress or expand the working gas by undergoing a reciprocating movement within the compressor body; and a leaf spring unit configured to support the reciprocating member to undergo the reciprocating movement within the compressor body, wherein the leaf spring unit includes a leaf spring having a first rim fixed to the compressor body, a first hub arranged on an inner side of the first rim and mounted on the reciprocating member, and a resilient arm part movably supporting the first hub with respect to the first rim; and an auxiliary spring having a second rim fixed to the compressor body, a second hub arranged on an inner side of the second rim and mounted on the reciprocating member, and an auxiliary spring part supported in a form of a cantilever on the second rim and the second hub, wherein the leaf spring is arranged between a pair of auxiliary springs, and the auxiliary spring part opposes the resilient arm part.

Other objects and further features of the present invention will be apparent from the following detailed description when read in conjunction with the accompanying drawings.

DETAILED DESCRIPTION

A description will be given of embodiments of the present invention, by referring to the drawings.

According to the structure of the spring unit in which the leaf springs are simply laminated via the spacer, stress may concentrate at a boundary part between the spacer and the leaf spring, and the spring unit may become damaged due to this stress.

Figure 1:
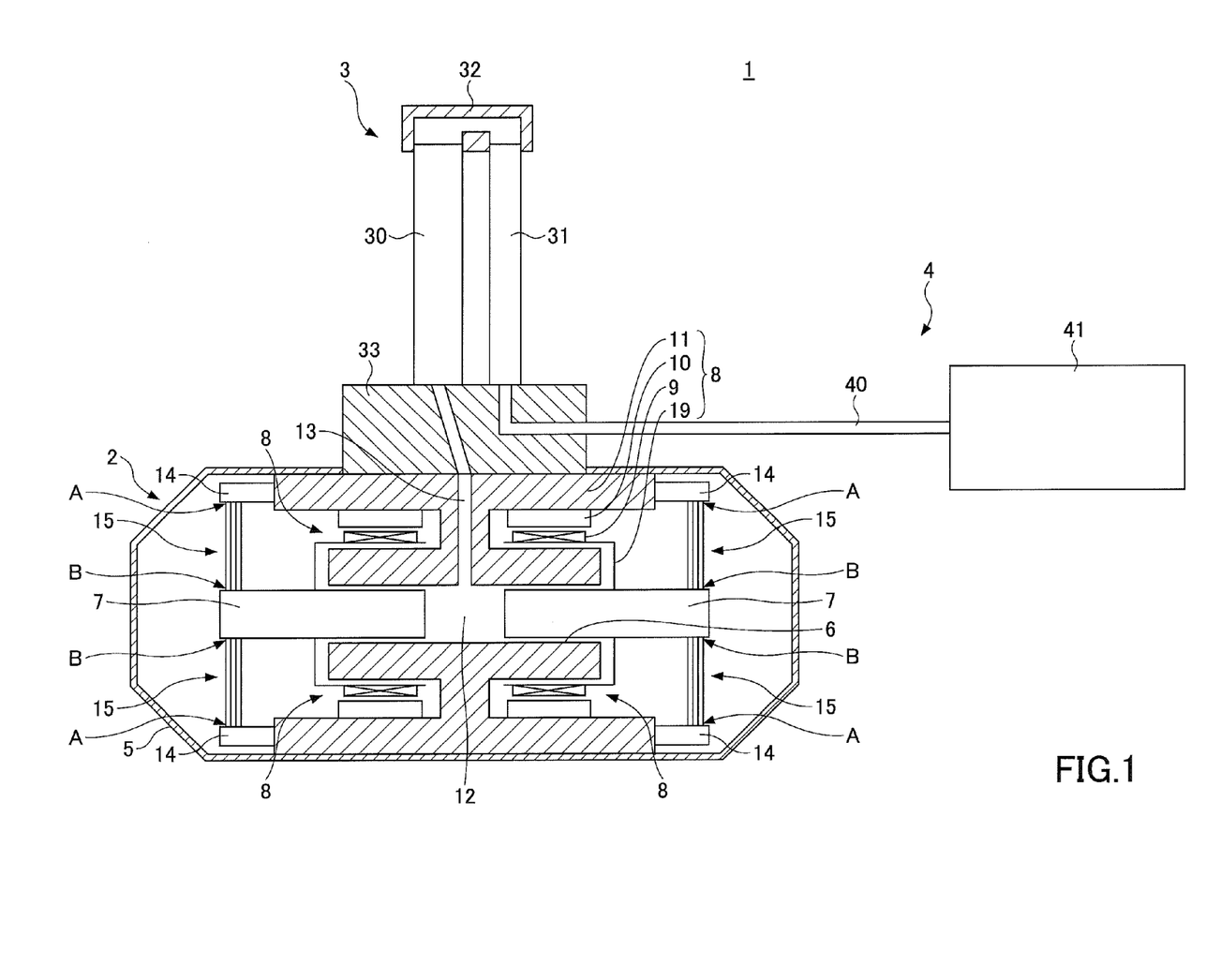
FIG. 1 is a cross sectional view illustrating a refrigerator and a compressor in an embodiment of the present invention.

FIG. 1 is a cross sectional view illustrating a refrigerator and a compressor in an embodiment of the present invention. In this embodiment, a Stirling pulse tube refrigerator (hereinafter simply referred to as "refrigerator") 1 is described as an example of the refrigerator. The refrigerator 1 may include a compressor 2, an expander 3, and a phase control unit 4.

The compressor 2 may include, within a compressor body (or a housing) 5, a cylinder 6, pistons 7, linear motors 8, leaf spring units 15, and the like.

The cylinder 6 may be provided in a central part of the compressor body 5 to extend in a horizontal direction (right and left directions) in FIG. 1. A pair of pistons 7 are arranged to oppose each other within the cylinder 6. The piston 7 may form an example of a reciprocating member. The pair of pistons 7 may be configured to undergo a linear reciprocating movement in an axial direction (horizontal direction in FIG. 1) within the cylinder 6. A compression chamber 12 may be provided between the pair of pistons 7. The compression chamber 12 may be connected to and communicate with the expander 3 via a passage 13.

A linear motor 8 may be provided with respect to each of the pistons 7. The linear motor 8 may drive the corresponding piston 7 to undergo the reciprocating movement within the cylinder 6. The linear motor 8 may be configured to include a permanent magnet 9, an electromagnetic coil 10, a yoke 11, and a support holder 19.

The permanent magnet 9 may be fixed to the piston 7 using the support holder 19. Hence, the permanent magnet 9 may move unitarily with the piston 7. In addition, the yoke 11 may be fixed to the compressor body 5. The yoke 11 may have a ring-shaped recess, and the permanent magnet 9 may arranged to be movable in the axial direction within the ring-shaped recess.

The electromagnetic coil 10 is arranged within the ring-shaped recess of the yoke 11, at a position opposing the permanent magnet 9. An A.C. current having a predetermined frequency may be supplied to the electromagnetic coil 10 from a power supply (not illustrated). When the A.C. current is supplied to the electromagnetic coil 10, a driving force is generated in the axial direction between the permanent magnet 9 and the electromagnetic coil 10. Because the electromagnetic coil 10 is fixed to the yoke 11 as described above, the piston 7 is driven by the driving force generated by the linear motor 8 and moves in the axial direction within the cylinder 6.

An outer peripheral part ("rim laminated structure" to be described later) of the leaf spring unit 15 may be fixed to the compressor body 5 via a support member 14, and an inner peripheral part ("hub laminated structure" to be described later) of the leaf spring unit 15 may be fixed to the piston 7. The leaf spring unit 15 may have a function to support the piston 7 in a movable manner within the compressor body 5 in order to enable a reciprocating movement of the piston 7. Hence, when the piston 7 is driven by the linear motor 8 in the axial direction, the leaf spring unit 15 may tolerate the movement of the piston 7 in the axial direction. When the piston 7 moves, the leaf spring unit 15 may apply, with respect to the piston 7, a resilient repulsive force in a direction opposite to the driving direction of the linear motor 8.

Accordingly, each piston 7 may undergo the reciprocating movement in the axial direction within the cylinder 6, to thereby raise and lower the pressure of working gas (or refrigerant gas) within the compression chamber 12. A pressure fluctuation of the working gas within the compression chamber 12 may be transferred to the expander 3 via the passage 13, to thereby generate coldness (or cold thermal energy) in the expander 3. A description on the detailed structure of the leaf spring unit 15 will be given later in the specification.

The expander 3 may include a regenerator 30, a pulse tube 31, a cold head (or low-temperature heat exchanger) 32, a heat exchanger 33, and the like, to thereby form an example of a pulse tube refrigerator.

The regenerator 30 may be configured to accumulate the coldness by filling a regenerative material within a tube. The pulse tube 31 may be formed by a cylindrical tube that connects to the regenerator 30 via the cold head 32. This embodiment employs a return type as an example of the connection type for the regenerator 30 and the pulse tube 31, however, the inline type may be employed.

Next, a description will be given of an operation of the pulse tube refrigerator. Energy of the working gas supplied (or ejected) from the compressor 2 may be transferred through the regenerator 30, the cold head 32 and the pulse tube 31, and be consumed by the phase control unit 4. The phase control unit 4 may be configured to include an inertance tube 40 and a buffer tank 41, for example, in order to generate a phase difference between the pressure and the change of the working gas within the pulse tube 31.

An energy gap corresponding to the work that is consumed when the working gas having the phase difference makes a transition from an isothermal state to an adiabatic state is generated between the regenerator 30 and the pulse tube 31, and the coldness is generated by heat absorption of the cold head 32 acting to compensate for the phase difference. On the other hand, a radiator 23 arranged on the high-temperature side (lower end part in FIG. 1) of the pulse tube 31 radiates heat corresponding to the heat absorption by the cold head 32. The series of operations described above may be repeated, in order to refrigerate refrigerating targets that are thermally connected to the cold head 32.

Next, a description will be given of the structure of the leaf spring unit 15, by referring to FIGS. 2 through 5.

Figure 2:
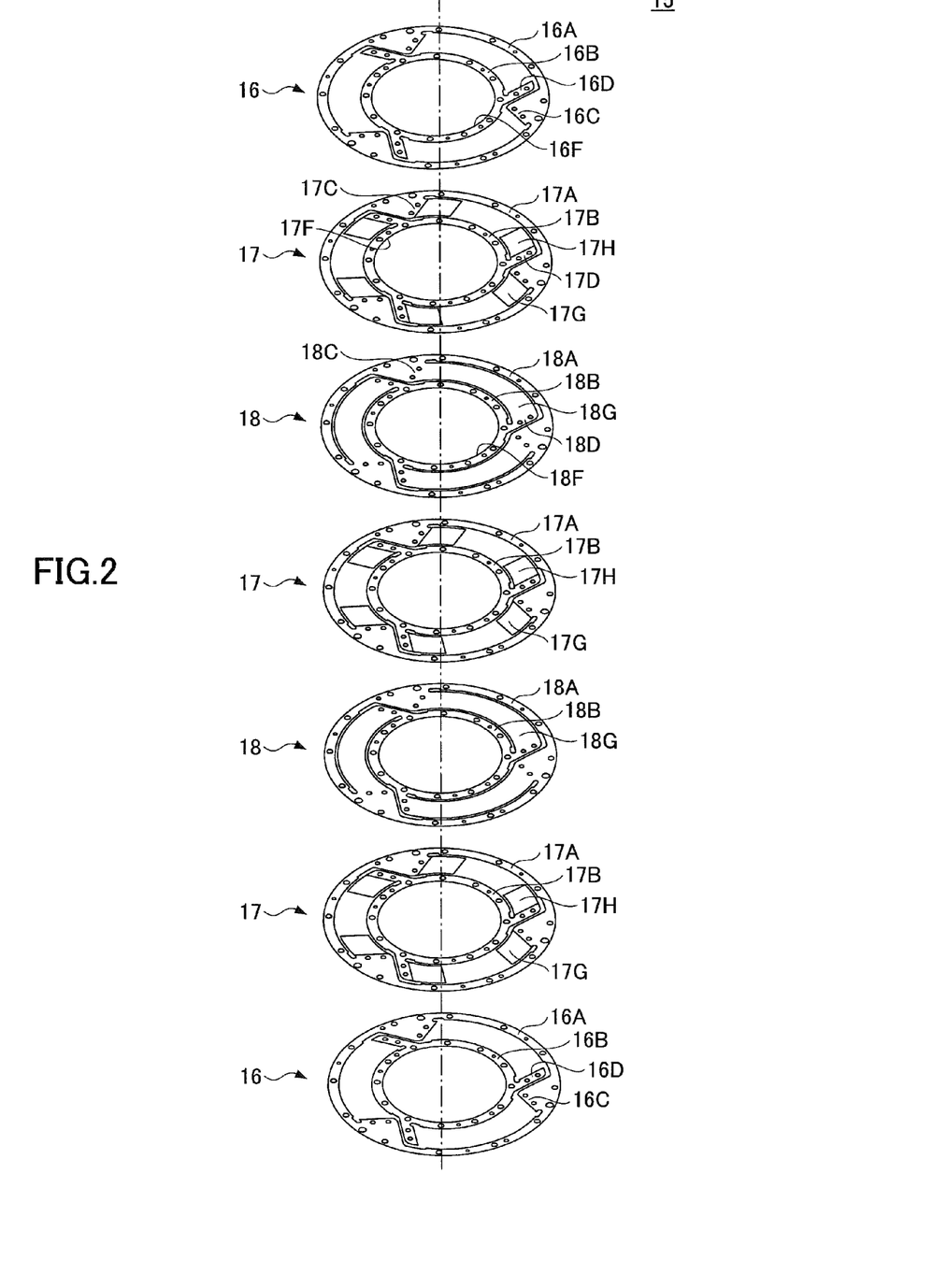
FIG. 2 is a disassembled perspective view illustrating a leaf spring unit provided in the refrigerator and the compressor in the embodiment of the present invention.

FIG. 2 is a disassembled perspective view illustrating the leaf spring unit 15 provided in the refrigerator 1 and the compressor 2 in this embodiment of the present invention. As illustrated in FIG. 2, the leaf spring unit 15 may include a plurality of retainers 16, a plurality of auxiliary springs 17, and a plurality of leaf springs 18 that are laminated. The leaf spring unit 15 in this embodiment includes two (2) retainers 16, three (3) auxiliary springs 17, and two (2) leaf springs 18. However, the number of each of the retainers 16, the auxiliary springs 17, and the leaf springs 18 is of course not limited to that of this embodiment.

The retainers 16 are arranged on both end parts of the leaf spring unit 15. The leaf spring 18 is arranged between a pair of auxiliary springs 17. Each of the retainers 16, the auxiliary springs 17, and the leaf springs 18 may be formed by pressing a metal plate made of stainless steel or the like.

Figure 3:
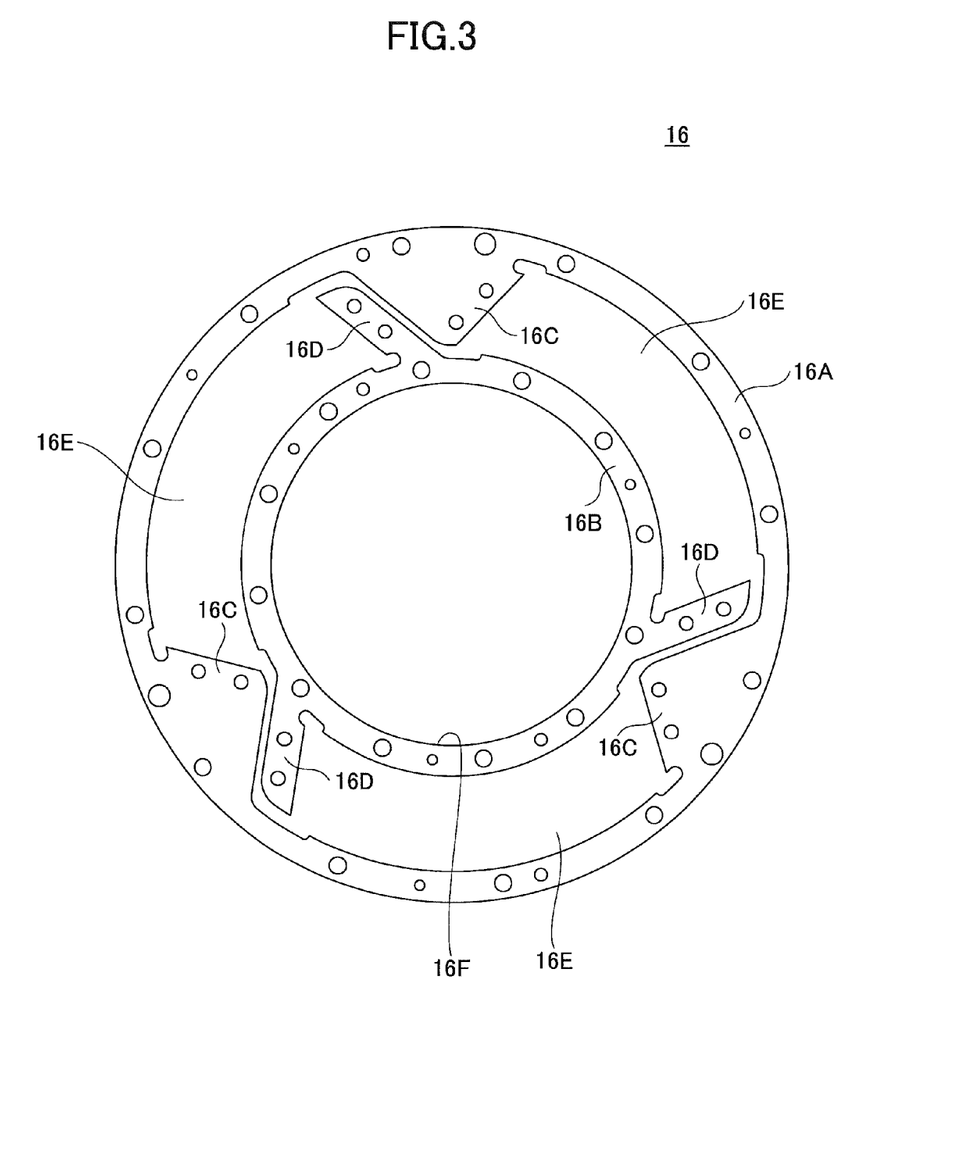
FIG. 3 is a diagram illustrating a retainer forming the leaf spring unit on an enlarged scale.

FIG. 3 is a diagram illustrating the retainer 16 forming the leaf spring unit 15 on an enlarged scale. As illustrated in FIG. 3, the retainer 16 may include a retainer rim 16A located on an outer side of the retainer 16, and a retainer hub 16B located on an inner side of the retainer 16.

The retainer rim 16A may have a ring shape, and triangular rim-side retainer parts 16C projecting towards the inner side may be formed at predetermined positions of the retainer rim 16A. In this embodiment, the predetermined positions of the retainer rim 16A may be arranged at 120-degree intervals.

The retainer hub 16B may have a ring shape that is smaller in diameter than the retainer rim 16A. The retainer hub 16B is arranged on the inner side of the retainer rim 16A. Hub-side retainer parts 16D projecting towards the outer side are arranged at predetermined positions of the retainer hub 16B. In this embodiment, the predetermined positions of the retainer hub 16B may be arranged at 120-degree intervals. In addition, a mounting hole 16F may be formed on the inner side of the retainer hub 16B. The piston 7 may be inserted into the mounting hole 16F.

The retainer rim 16A and the retainer hub 16B are separate bodies. In a state in which the leaf spring unit 15 is assembled, a space 16E is formed between the retainer rim 16A and the retainer hub 16B. In addition, in the assembled state of the leaf spring unit 15, resilient arm parts 18G of the leaf spring 18 which will be described later are arranged within the space 16E.

Figure 4:
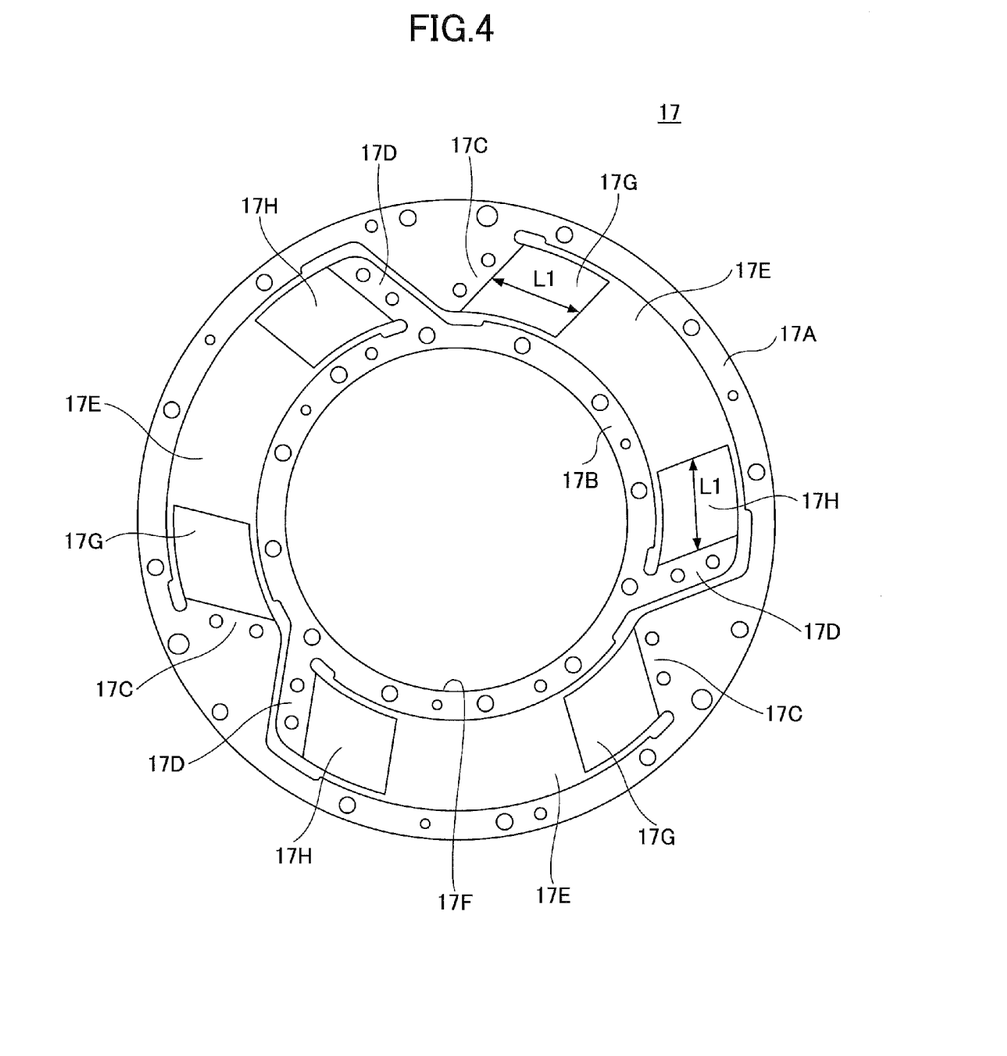
FIG. 4 is a diagram illustrating an auxiliary spring forming the leaf spring unit on an enlarged scale.

FIG. 4 is a diagram illustrating the auxiliary spring 17 forming the leaf spring unit 15 on an enlarged scale. As illustrated in FIG. 4, the auxiliary spring 17 may include an auxiliary spring rim 17A located on an outer side of the auxiliary spring 17, and an auxiliary spring hub 17B located on an inner side of the auxiliary spring 17.

The auxiliary spring rim 17A may have a ring shape, and triangular rim-side retainer parts 17C projecting towards the inner side may be formed at predetermined positions of the auxiliary spring rim 17A. The triangular rim-side retainer parts 17C are located at positions corresponding to the locations of the triangular rim-side retainer parts 16C of the retainer 16.

The auxiliary spring hub 17B may have a ring shape that is smaller in diameter than the auxiliary spring rim 17A. The auxiliary spring hub 17B is arranged on the inner side of the auxiliary spring rim 17A. Hub-side retainer parts 17D projecting towards the outer side are arranged at predetermined positions of the auxiliary spring hub 17B. The hub-side retainer parts 17D are arranged at locations corresponding to the locations of the hub-side retainer parts 16D of the retainer 16. In addition, a mounting hole 17F may be formed on the inner side of the auxiliary spring hub 17B. The piston 7 may be inserted into the mounting hole 17F.

The auxiliary spring rim 17A and the auxiliary spring hub 17B are separate bodies. In a state in which the leaf spring unit 15 is assembled, a space 17E is formed between the auxiliary spring rim 17A and the auxiliary spring hub 17B. In addition, in the assembled state of the leaf spring unit 15, the resilient arm parts 18G of the leaf spring 18 which will be described later are arranged within the space 17E.

A rim-side auxiliary spring part 17G may extend towards the space 17E from each rim-side retainer part 17C of the auxiliary spring rim 17A. Similarly, a hub-side auxiliary spring part 17H may project towards the space 17E from each hub-side retainer part 17D of the auxiliary spring hub 17B.

The rim-side auxiliary spring part 17G projects from the rim-side retainer part 17C, and the hub-side auxiliary spring part 17H projects from the hub-side retainer part 17D. Hence, one end of the rim-side auxiliary spring part 17G may be fixed to the rim-side retainer part 17C, and the other end of the rim-side auxiliary spring part 17G may form a free end projecting in the form of a cantilever, to thereby form a leaf spring. Similarly, one end of the hub-side auxiliary spring part 17H may be fixed to the hub-side retainer part 17D, and the other end of the hub-side auxiliary spring part 17H may form a free end projecting in the form of a cantilever, to thereby form a leaf spring.

Figure 5:
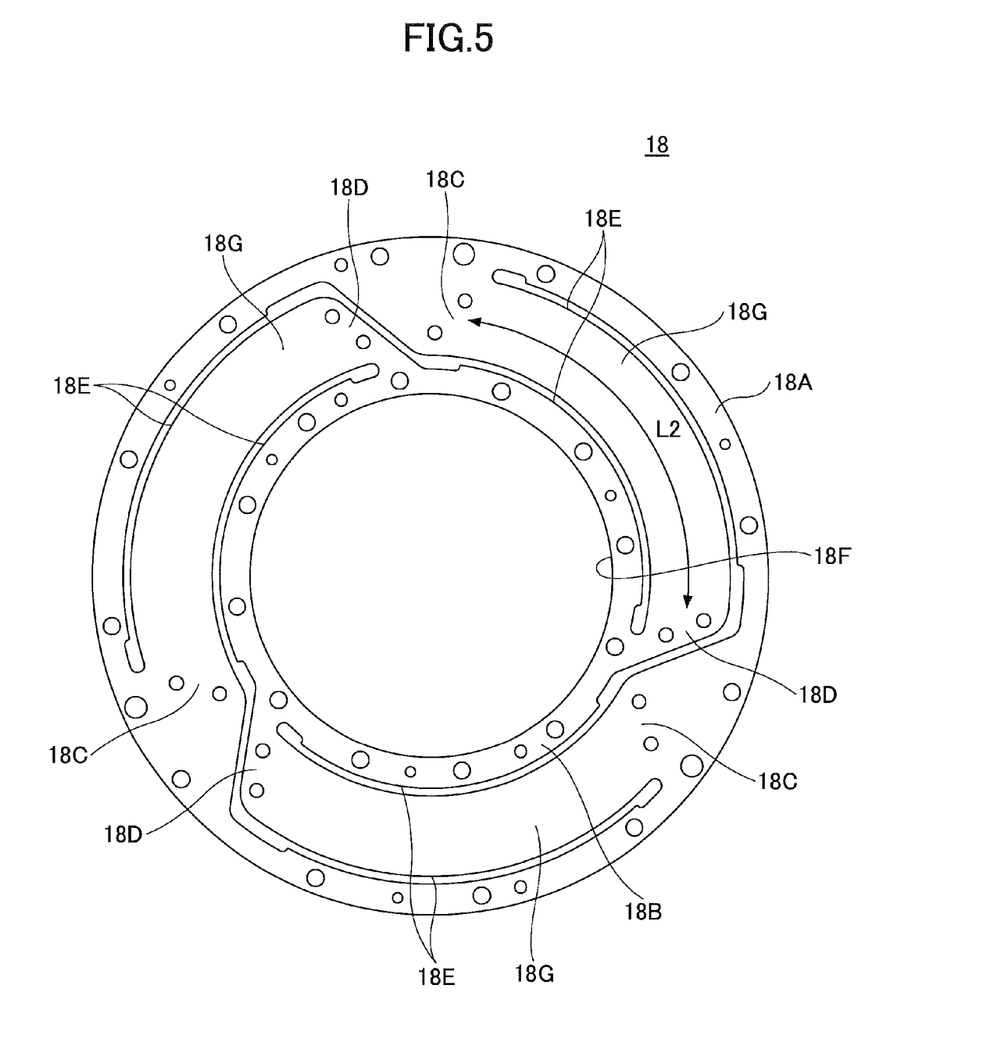
FIG. 5 is a diagram illustrating a leaf spring forming the leaf spring unit on an enlarged scale.

FIG. 5 is a diagram illustrating the leaf spring 18 forming the leaf spring unit 15 on an enlarged scale. As illustrated in FIG. 5, the leaf spring 18 may include a leaf spring rim 18A located on an outer side of the leaf spring 18, a leaf spring hub 18B located on an inner side of the leaf spring 18, and the resilient arm parts 18G.

The leaf spring rim 18A may have a ring shape, and triangular rim retainer parts 18C projecting towards the inner side may be formed at predetermined positions of the leaf spring rim 18A. The triangular rim retainer parts 18C are located at positions corresponding to the locations of the triangular rim-side retainer parts 16C of the retainer 16 and the triangular rim-side retainer parts 17C of the auxiliary spring 17.

The leaf spring hub 18B may have a ring shape that is smaller in diameter than the leaf spring rim 18A. The leaf spring hub 18B is arranged on the inner side of the leaf spring rim 18A. Hub retainer parts 18D projecting towards the outer side are arranged at predetermined positions of the leaf spring hub 18B. The hub retainer parts 18D are arranged at locations corresponding to the locations of the hub-side retainer parts 16D of the retainer 16 and the hub-side retainer parts 17D of the auxiliary spring 17. In addition, a mounting hole 18F may be formed on the inner side of the leaf spring hub 18B. The piston 7 may be inserted into the mounting hole 18F.

One end of the resilient arm part 18G may be attached to the rim retainer part 18C, and the other end of the resilient arm part 18G may be attached to the hub retainer part 18D. Hence, the leaf spring rim 18A and the leaf spring hub 18B may be attached via the resilient arm part 18G. In addition, a slit 18E may be formed between the leaf spring rim 18A and the resilient arm part 18G, and between the leaf spring hub 18B and the resilient arm part 18G. Accordingly, the resilient arm part 18G may function as a leaf spring having both ends thereof supported. The resilient arm part 18G may have a function to movably support the leaf spring hub 18B with respect to the leaf spring rim 18A.

In the retainer 18, the auxiliary spring 17, and the leaf spring 18 having the structures described above, the retainer rim 16A, the auxiliary spring rim 17A, and the leaf spring rim 18A may have the same shape. Further, the retainer hub 16B, the auxiliary spring hub 17B, and the leaf spring hub 18B may have the same shape.

Accordingly, when the plurality of retainers 16, the plurality of auxiliary springs 17, and the plurality of leaf springs 18 are assembled in the manner illustrated in FIG. 2 in order to form the leaf spring unit 15, the retainer rim 16A, the auxiliary spring rim 17A, and the leaf spring rim 18A are laminated (or stacked) to form the rim laminated structure. In addition, the retainer hub 16B, the auxiliary spring hub 17B, and the leaf spring hub 18B are laminated (or stacked) to form the hub laminated structure, on the inner side of the rim laminated structure.

Furthermore, as described above, the retainer rim 16A and the retainer hub 16B are separate bodies, and the auxiliary spring rim 17A and the auxiliary spring hub 17B are separate bodies. On the other hand, the leaf spring rim 18A and the leaf spring hub 18B of the leaf spring 18 may be attached via the resilient arm part 18G. Hence, in this embodiment, the rim laminated structure and the hub laminated structure are attached only via the resilient anti parts 18G.

The rim laminated structure (part indicated by an arrow A in FIG. 1) located on the outer periphery of the leaf spring unit 15 may be fixed to the compressor body 5 via the support member 14. In addition, the hub laminated structure (part indicated by an arrow B in FIG. 1) located on the inner side of the leaf spring unit 15 may be fixed to the piston 7 that is inserted into each of the mounting holes 16F, 17F, and 18F. As a result, the piston 7 may be movable to undergo a linear reciprocating movement in the axial direction (horizontal direction in FIG. 1) within the cylinder 6, and the movement of the piston 7 in other directions may be restricted, due to the leaf spring unit 15. Therefore, by supporting the piston 7 by the leaf spring unit 15, friction between the cylinder 6 and the piston 7 may be reduced, the reliability of the refrigerator 1 may be improved, and the life of the refrigerator 1 may be extended.

Next, a description will be given of each of the auxiliary spring parts 17G and 17H formed on the auxiliary spring 17.

As illustrated in FIG. 2, the auxiliary spring 17 and the leaf spring 18 are alternately laminated. More particularly, in the leaf spring unit 15, the leaf spring 18 is arranged (or interposed) between one pair of auxiliary springs 17.

In addition, in the leaf spring 18, the resilient arm part 18G is arranged between the rim retainer part 18C and the hub retainer part 18D. Further, in the auxiliary spring 17, the rim-side auxiliary spring part 17G is formed to extend from the rim-side retainer part 17C into the space 17E in the form of the cantilever. Similarly, the hub-side auxiliary spring part 17H is formed to extend from the hub-side retainer part 17D into the space 17E in the form of the cantilever.

Accordingly, in the assembled state of the leaf spring unit 15, the rim-side auxiliary spring part 17G and the hub-side auxiliary spring part 17H oppose the resilient arm part 18G. More particularly, a predetermined range of the resilient arm part 18G in a vicinity of the rim retainer part 18C opposes the rim-side auxiliary spring part 17G. Similarly, a predetermined range of the resilient arm part 18G in a vicinity of the hub retainer part 18D opposes the hub-side auxiliary spring part 17H.

In this state, a length of each of the auxiliary spring parts 17G and 17H indicated by an arrow L1 in FIG. 4 may be short compared to a length of the resilient arm part 18G indicated by an arrow L2 in FIG. 5 (that is, L1<L2). More particularly, the length L1 of each of the auxiliary spring parts 17G and 17H may be approximately 10 percent to approximately 25 percent of the length L2 of the resilient arm part 18G.

Moreover, a plate thickness T1 of each of the auxiliary spring parts 17G and 17H may be small compared to a plate thickness T2 of the resilient arm part 18G (that is, T1<T2). More particularly, the plate thickness T1 of each of the auxiliary spring parts 17G and 17H may be approximately 10 percent to approximately 40 percent of the plate thickness T2 of the resilient arm part 18G.

Furthermore, a rigidity (or stiffness) of each of the auxiliary spring parts 17G and 17H may be low compared to a rigidity of the resilient arm part 18G. More particularly, the rigidity of each of the auxiliary spring parts 17G and 17H may be approximately 2 percent to approximately 10 percent of the rigidity of the resilient arm part 18G.

Next, a description will be given of an operation of the leaf spring unit 15 having the structure described above, by referring to FIG. 6.

Figure 6:
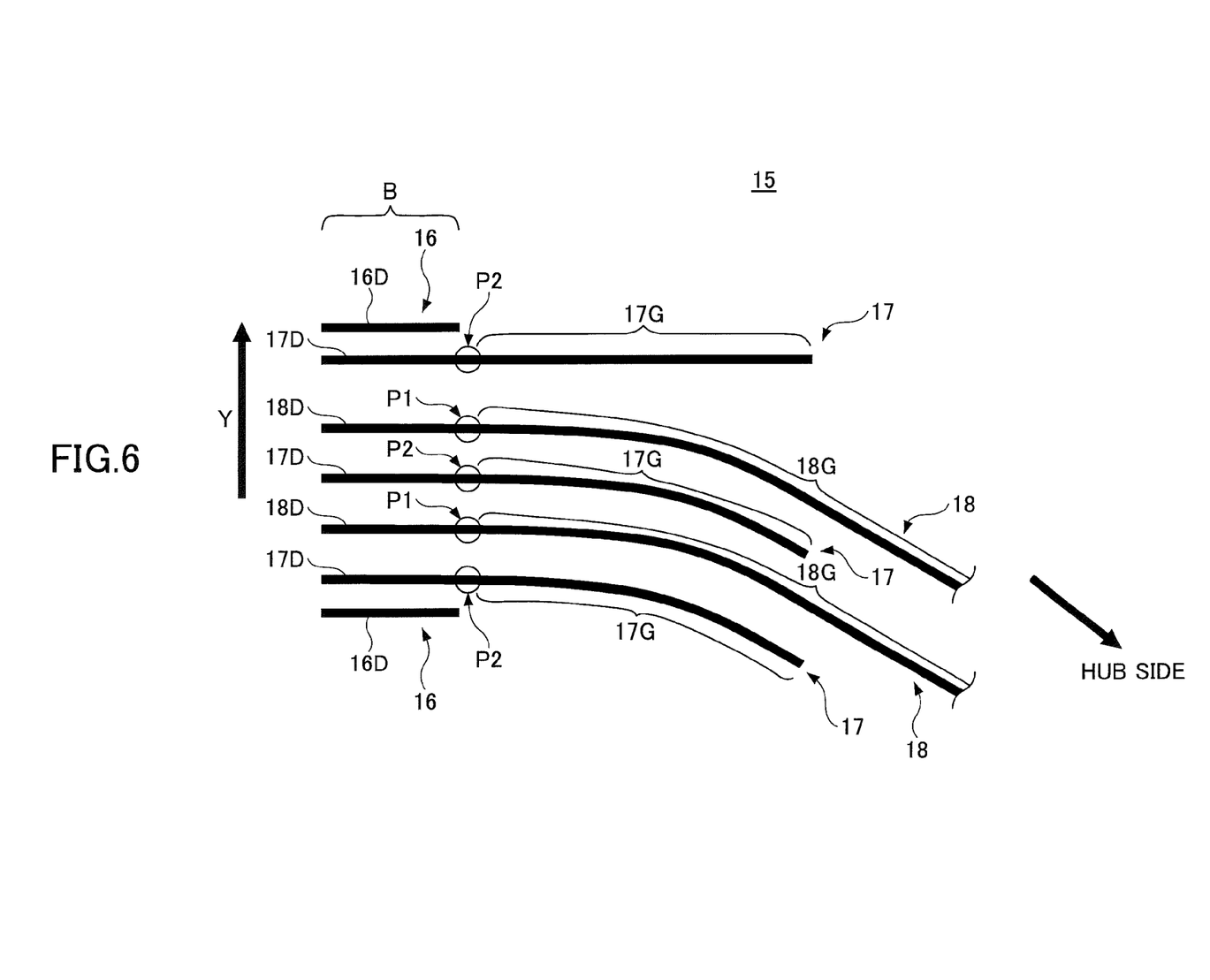
FIG. 6 is a diagram for explaining an operation of the leaf spring unit.

FIG. 6 is a diagram for explaining the operation of the leaf spring unit 15. FIG. 6 illustrates a vicinity of the hub laminated structure B (part where the hub-side retainer part 16D, the hub-side retainer part 17D, and the hub retainer part 18D are laminated) of the leaf spring unit 15 on an enlarged scale.

In a state in which the piston 7 does not move, the auxiliary spring 17 and the leaf spring 18 are parallel to each other. Hence, the rim-side auxiliary spring part 17G and the resilient arm part 18G are parallel and oppose each other. This state will also be referred hereinafter as a "reference state".

When the linear motor 8 is driven in this reference state, the piston 7 moves within the cylinder 6. FIG. 6 illustrates a state in which the hub laminated structure B (part fixed to the piston 7) of the leaf spring unit 15 has moved in an arrow direction Y in FIG. 6 with respect to the rim laminated structure A (part fixed to the compressor body 5), due to the movement of the piston 7.

When the hub laminated structure B moves in the arrow direction Y with respect to the rim laminated structure A, the resilient arm part 18G attaching the leaf spring rim 18A and the leaf spring hub 18B may undergo a resilient deformation. More particularly, the resilient arm part 18G may be resiliently deformed to curve towards the bottom right direction in FIG. 6 from the hub retainer part 18D.

When the resilient arm part 18G undergoes such a resilient deformation, the resilient arm part 18G makes contact with the rim-side auxiliary spring part 17G of the auxiliary spring 17, located on the lower part of the leaf spring 18 in FIG. 6, and pushes the rim-side auxiliary spring part 17G in order to urge the rim-side auxiliary spring part 17G towards the lower direction in FIG. 6.

As described above, the rim-side auxiliary spring part 17G may function as a leaf spring having the form of the cantilever. For this reason, when the rim auxiliary spring part 17G located at the lower part in FIG. 6 is pushed by the resilient arm part 18G, this rim auxiliary spring part 17G may undergo a resilient deformation together with the resilient arm part 18G. On the other hand, the auxiliary spring 17 located above the leaf spring 18 at the upper part in FIG. 6 may maintain the horizontal state without undergoing the resilient deformation.

When a case is considered in which the pair of auxiliary springs 17 are not provided in FIG. 6, only the retainer 16 will exist above and below the leaf spring 18. In this case, the retainer 16 becomes equivalent to the conventional spacer, and stress may concentrate on each resilient arm part 18G at a position indicated by an arrow P1 in FIG. 6.

On the other hand, when the leaf spring 18 is arranged between the pair of auxiliary springs 17 as in this embodiment, the rim auxiliary spring part 17G exists above and below the position P1, that is, a boundary position between the rub retainer part 18D and the resilient arm part 18G. In addition, when the resilient arm part 18G undergoes the resilient deformation described above, the resilient arm part 18G makes contact with the rim auxiliary spring part 17G located in the direction towards which the resilient arm part 18G resiliently deforms. Consequently, the rim auxiliary spring part 17G may resiliently deform together with the resilient arm part 18G.

Accordingly, a sudden deformation at the boundary position P1 between the hub retainer part 18D and the resilient arm part 18G may be suppressed, in order to reduce the concentration of the stress at the position P1. Thus, it may be possible to suppress generation of cracks or damages in the resilient arm part 18G, and the reliability of the leaf spring 18 may be improved, and the life of the leaf spring 18 may be extended.

By arranging the leaf spring 18 between the pair of auxiliary springs 17 in this embodiment, concentration of the stress may be generated at a boundary position (indicated by an arrow P2 in FIG. 6) between the hub-side retainer part 17D and the rim auxiliary spring part 17G of each auxiliary spring 17 when the leaf spring 18 undergoes the resilient deformation.

However, unlike the resilient arm part 18G, the rim auxiliary spring part 17G does not have the function to support the piston 7 with respect to the compressor body 5. For this reason, the spring constant of the rim auxiliary spring part 17G may be set more freely compared to the resilient arm part 18G.

More particularly, in this embodiment, the length L1 of the auxiliary spring 17 is set shorter than the length L2 of the resilient arm part 18G, the plate thickness T1 of the auxiliary spring 17 is set thinner than the plate thickness T2 of the resilient arm part 18G, and the rigidity of the rim auxiliary spring part 17G is set lower than the rigidity of the resilient arm part 18G, as described above. In addition, the resilient arm part 18G forms a left spring in the form of a double-supported beam fixed on both ends, while the rim auxiliary spring part 17G forms the cantilever free on one end.

Accordingly, the spring constant of the rim auxiliary spring part 17G may be small compared to that of the resilient arm part 18G, and the stress may uneasily be concentrated on the resilient arm part 18G. For this reason, the concentration of the stress at the boundary position P2 between the hub-side retainer part 17D and the rim auxiliary spring part 17G may be suppressed. In other words, the life of the leaf spring 15 is not shortened by the provision of the rim auxiliary spring part 17G in the auxiliary spring 17.

In the example described above, the operation on the side of the hub laminated structure B of the leaf spring unit 15 is given for the sake of convenience. However, the operation on the side of the rim laminated structure A of the leaf spring unit 15 may be carried out in a similar manner, and similar functions and effects may be obtained. In the operation on the side of the hub laminated structure B, the moving direction is opposite to that of the operation on the side of the rim laminated structure A, however, other basic operations may be the same and a description thereof will thus be omitted.

According to the embodiment, the reliability of the leaf spring may be improved and/or the life of the leaf spring may be extended.

It should be understood that the invention is not limited to the above-described embodiment, but may be modified into various forms on the basis of the spirit of the invention. Additionally, the modifications are included in the scope of the invention.

What is claimed is:

1. A refrigerator comprising:
a compressor; and
an expander configured to generate coldness in a working gas supplied from the compressor;
the compressor comprising:
   a compressor body;
   a reciprocating member configured to compress or expand the working gas by undergoing a reciprocating movement within the compressor body; and
   a leaf spring unit configured to support the reciprocating member to undergo the reciprocating movement within the compressor body,
wherein the leaf spring unit includes
   a leaf spring having a first rim fixed to the compressor body, a first hub arranged on an inner side of the first rim and mounted on the reciprocating member, and a resilient arm part movably supporting the first hub with respect to the first rim; and
   an auxiliary spring having a second rim fixed to the compressor body, a second hub arranged on an inner side of the second rim and mounted on the reciprocating member, and a pair of auxiliary spring parts supported in a form of a cantilever on the second rim and the second hub,
wherein the leaf spring is arranged between the pair of auxiliary spring parts, and the pair of auxiliary spring parts opposes the resilient arm part, and
wherein each auxiliary spring part included in the pair of auxiliary spring parts has a length shorter than that of the resilient arm part.

2. The refrigerator as claimed in claim 1, wherein each auxiliary spring part included in the pair of auxiliary spring parts has a rigidity lower than that of the resilient arm part.

3. The refrigerator as claimed in claim 1, wherein each auxiliary spring part included in the pair of auxiliary spring parts has a thickness smaller than that of the resilient arm part.

4. A compressor comprising:
a compressor body;
a reciprocating member configured to compress or expand a working gas by undergoing a reciprocating movement within the compressor body; and
a leaf spring unit configured to support the reciprocating member to undergo the reciprocating movement,
wherein the leaf spring unit includes
   a leaf spring having a first rim fixed to the compressor body, a first hub arranged on an inner side of the first rim and mounted on the reciprocating member, and a resilient arm part movably supporting the first hub with respect to the first rim; and
   an auxiliary spring having a second rim fixed to the compressor body, a second hub arranged on an inner side of the second rim and mounted on the reciprocating member, and a pair of auxiliary spring parts supported in a form of a cantilever on the second rim and the second hub,
wherein the leaf spring is arranged between the pair of auxiliary spring parts, and the pair of auxiliary spring parts opposes the resilient arm part, and
wherein each auxiliary spring part included in the pair of auxiliary spring parts has a length shorter than that of the resilient arm part.

5. The compressor as claimed in claim 4, wherein each auxiliary spring included in the pair of auxiliary spring parts has a rigidity lower than that of the resilient arm part.

6. The compressor as claimed in claim 4, wherein each auxiliary spring part included in the pair of auxiliary spring parts has a thickness smaller than that of the resilient arm part.

* * * * *